United States Patent
Laine et al.

(10) Patent No.: US 10,541,805 B2
(45) Date of Patent: Jan. 21, 2020

(54) VARIABLE RELINEARIZATION IN HOMOMORPHIC ENCRYPTION

(71) Applicant: Microsoft Technology Licensing, LLC, Redmond, WA (US)

(72) Inventors: Kim Henry Martin Laine, Seattle, WA (US); Hao Chen, Seattle, WA (US); Yuhou Xia, Princeton, NJ (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 75 days.

(21) Appl. No.: 15/633,284

(22) Filed: Jun. 26, 2017

(65) Prior Publication Data

US 2018/0375640 A1 Dec. 27, 2018

(51) Int. Cl.
*H04L 9/00* (2006.01)
*H04L 29/06* (2006.01)
*H04L 9/30* (2006.01)

(52) U.S. Cl.
CPC .......... *H04L 9/008* (2013.01); *H04L 9/30* (2013.01); *H04L 9/3006* (2013.01); *H04L 63/0442* (2013.01)

(58) Field of Classification Search
CPC ......... H04L 9/008; H04L 9/30; H04L 9/3006; H04L 9/0637; H04L 9/0457; H04L 9/3093; H04L 9/0662; H04L 9/28; H04L 63/0442; H04L 63/0428; H04L 63/0435; G06F 21/602; G06F 21/606
(Continued)

(56) References Cited

U.S. PATENT DOCUMENTS 8,429,421 B2   4/2013 Chase et al.
8,515,058 B1   8/2013 Gentry
(Continued)

FOREIGN PATENT DOCUMENTS

EP   2924911 A1   9/2015

OTHER PUBLICATIONS

Yong et al., A Novel Fully Homomorphic Encryption Scheme Bsed on LWE, Springer (Year: 2016).*
(Continued)

*Primary Examiner* — Kambiz Zand
*Assistant Examiner* — Mahabub S Ahmed
(74) *Attorney, Agent, or Firm* — Alleman Hall Creasman & Tuttle LLP

(57) ABSTRACT

In aspects of variable relinearization in homomorphic encryption, a computing device stores homomorphic encrypted data as a dataset, and implements an encryption application that can perform a multiplication operation on a ciphertext in the homomorphic encrypted data, where the multiplication operation contributes to increase a noise component in the ciphertext. The encryption application can determine a relinearization amount by which to relinearize the ciphertext after the multiplication operation, where the determination is effective to optimize a noise increase in the ciphertext based at least in part on projected subsequent multiplication operations on the ciphertext. The encryption application can then relinearize the ciphertext utilizing the determined relinearization amount that optimizes the noise increase in the ciphertext for optimal relinearization performance.

19 Claims, 5 Drawing Sheets

(58) Field of Classification Search
USPC .................................................. 380/31–46
See application file for complete search history.

(56) References Cited

U.S. PATENT DOCUMENTS

| | | | |
|---|---|---|---|
| 8,903,083 B2 | 12/2014 | Gentry et al. | |
| 9,202,079 B2 | 12/2015 | Kaliski, Jr. | |
| 9,436,835 B1* | 9/2016 | Saldamli | G06F 21/602 |
| 10,075,288 B1 | 9/2018 | Khedr et al. | |
| 10,116,437 B1* | 10/2018 | Krendelev | H04L 9/008 |
| 2002/0027986 A1 | 3/2002 | Brekne | |
| 2004/0078414 A1 | 4/2004 | Geiringer et al. | |
| 2007/0116283 A1* | 5/2007 | Tuyls | H04L 9/008 380/255 |
| 2008/0294909 A1 | 11/2008 | Ostrovsky et al. | |
| 2009/0327748 A1 | 12/2009 | Agrawal et al. | |
| 2010/0020965 A1 | 1/2010 | Gueron et al. | |
| 2011/0110525 A1* | 5/2011 | Gentry | H04L 9/0822 380/285 |
| 2012/0039463 A1 | 2/2012 | Gentry et al. | |
| 2012/0039473 A1* | 2/2012 | Gentry | H04L 9/008 380/277 |
| 2013/0014270 A1* | 1/2013 | Sy | H04L 9/008 726/26 |
| 2013/0024653 A1 | 1/2013 | Gove | |
| 2013/0170640 A1* | 7/2013 | Gentry | H04L 9/008 380/30 |
| 2013/0216044 A1* | 8/2013 | Gentry | H04L 9/008 380/277 |
| 2013/0329883 A1* | 12/2013 | Tamayo-Rios | H04L 9/008 380/28 |
| 2014/0177828 A1* | 6/2014 | Loftus | H04L 9/008 380/44 |
| 2014/0215222 A1* | 7/2014 | Sakumoto | H04L 9/3252 713/176 |
| 2014/0233727 A1 | 8/2014 | Rohloff et al. | |
| 2014/0325230 A1* | 10/2014 | Sy | G06F 21/32 713/171 |
| 2015/0033018 A1 | 1/2015 | Tateishi et al. | |
| 2015/0039912 A1 | 2/2015 | Payton et al. | |
| 2015/0046450 A1 | 2/2015 | Yoshino et al. | |
| 2015/0046708 A1 | 2/2015 | Yasuda et al. | |
| 2015/0280914 A1 | 10/2015 | Yasuda et al. | |
| 2015/0288665 A1 | 10/2015 | El Emam et al. | |
| 2015/0295716 A1 | 10/2015 | Liu | |
| 2015/0312031 A1* | 10/2015 | Seo | H04L 9/008 380/28 |
| 2015/0358153 A1* | 12/2015 | Gentry | H04L 9/008 380/30 |
| 2015/0365229 A1* | 12/2015 | Patey | H04L 9/008 380/30 |
| 2016/0105402 A1* | 4/2016 | Soon-Shiong | H04L 63/0428 713/164 |
| 2016/0119119 A1* | 4/2016 | Calapodescu | H04L 9/30 380/30 |
| 2016/0191233 A1* | 6/2016 | Loftus | H04L 9/008 713/189 |
| 2017/0134157 A1 | 5/2017 | Laine et al. | |
| 2017/0134158 A1* | 5/2017 | Pasol | H04L 9/008 |
| 2017/0293913 A1 | 10/2017 | Gulak et al. | |
| 2018/0198601 A1 | 7/2018 | Laine et al. | |
| 2018/0278410 A1 | 9/2018 | Hirano et al. | |
| 2018/0375639 A1 | 12/2018 | Lauter et al. | |
| 2019/0007197 A1 | 1/2019 | Laine et al. | |

OTHER PUBLICATIONS

Brakerski et al., Efficient Fully Homomorphic Encryption from (Standard) LWE, IEEE (Year: 2011).*
Zhang et al., Efficient fully homomorphic encryption from RLWE with an extension to a threshold encryption scheme, Elsevier (Year: 2013).*
Chen et al., Fully Homomorphic Encryption Application in Cloud Computing, IEEE (Year: 2014).*
Wang, Octonion Algebra and Noise-Free Fully Homomorphic Encryption (FHE) Schemes, Department of SIS, UNC Charlotte, USA. (Year: 2016).*
Zhang et al., Efficient fully homomorphic encryption from RLWE with an extension to a threshold encryption scheme, Elsevier (Year: 2013) (Year: 2013).*
Yong et al., A Novel Fully Homomorphic Encryption Scheme Bsed on LWE, Springer (Year: 2016) (Year: 2016).*
Brakerski et al., Efficient Fully Homomorphic Encryption from (Standard) LWE, IEEE (Year: 2011) (Year: 2011).*
Chen et al., Fully Homomorphic Encryption Application in Cloud Computing, IEEE (Year: 2014) (Year: 2014).*
Wang, Octonion Algebra and Noise-Free Fully Homomorphic Encryption (FHE) Schemes, Department of SIS, UNC Charlotte, USA. (Year: 2016) (Year: 2016).*
Fan et al., Somewhat Practical Fully Homomorphic Encryption, IACR Cryptology ePrint Archive—downloaded from google.com (Year: 2012).*
Lopez-Alt, Adriana, "Cryptographic Algorithms for the Secure Delegation of Multiparty Computation", In Doctoral Dissertation of New York University, May 2014, 120 pages.
Beck,"Approximate Two-Party Privacy-Preserving String Matching with Linear Complexity", In Proceedings of IEEE International Congress on Big Data, BigData Congress, Jun. 27, 2013, 14 pages.
Cetin,"Arithmetic Using Word-wise Homomorphic Encryption", https://eprint.iacr.org/2015/1195.pdf, Retrieved on: Oct. 21, 2016, 15 pages.
Ozturk,"Accelerating Somewhat Homomorphic Evaluation using FPGAs", In Journal of IACR Cryptology ePrint Archive, Retrieved on: Oct. 18, 2016, Mar. 28, 2015, 15 pages.
Stehle,"Faster Fully Homomorphic Encryption", In Proceedings of International Conference on the Theory and Application of Cryptology and Information Security, Dec. 5, 2010, 25 pages.
Jaschke, et al., "Accelerating Homomorphic Computations on Rational Numbers", In Proceedings of International Conference on Applied Cryptography and Network Security, Jun. 19, 2016, 19 Pages.
Chase, et al., "Substring-Searchable Symmetric Encryption", In Proceedings on Privacy Enhancing Technologies, Jun. 18, 2015, 28 Pages.
Chen, et al., "Cocoon: Encrypted Substring Search", Retrieved From: https://pdfs.semanticscholarorg/ae2b/b2dd98ce5db50703005e3c6c7b43045621ca.pdf, May 11, 2016, 14 Pages.
Chen, et al., "Simple Encrypted Arithmetic Library—Seal v2.1", In Proceedings of International Conference on Financial Cryptography and Data Security, Nov. 19, 2017, 27 Pages.
Chung, et al., "Encoding Rational Numbers for FHE-based Applications", In Proceedings for International Association for Cryptologic Research, Mar. 30, 2016, 19 Pages.
Dowlin, et al., "Manual for Using Homomorphic Encryption for Bioinformatics", In Proceedings of the IEEE vol. 105, Issue 3, Mar. 2017, 18 Pages.
Fan, et al., "Somewhat Practical Fully Homomorphic Encryption", In Journal of IACR Cryptology ePrint Archive, Mar. 2012, 19 Pages.
Fouque, et al., "CryptoComputing with Rationals", In Proceedings of International Conference on Financial Cryptography, Mar. 11, 2002, 11 Pages.
Laine, Kim, "String Matching on Homomorphically Encrypted Data", Retrieved From: http://kimlaine.org/talks/IISc2017.pdf, Retrieved Date: Mar. 27, 2017, 28 Pages.
Lepoint, et al., "A Comparison of the Homomorphic Encryption Schemes FV and YASHE", In Proceedings of 7th International Conference on Cryptology in Africa, May 28, 2014, 18 Pages.
"International Search Report and Written Opinion Issued in PCT Application No. PCT/US2018/039571", dated Oct. 9, 2018, 13 Pages.
"International Search Report and Written Opinion Issued in PCT Application No. PCT/US2018/039634", dated Oct. 8, 2018, 13 Pages.

(56) References Cited

OTHER PUBLICATIONS

"Non Final Office Action Issued in U.S. Appl. No. 15/630,824", dated Jan. 7, 2019, 33 Pages.
"Non Final Office Action Issued in U.S. Appl. No. 15/638,181", dated Dec. 27, 2018, 12 Pages.
"Non-Final Office Action Issued in U.S. Appl. No. 15/630,761", dated Mar. 22, 2019, 21 Pages.
"Final Office Action Issued in U.S. Appl. No. 15/638,181", dated Jun. 21, 2019, 24 Pages.
"Final Office Action Issued in U.S. Appl. No. 15/630,824", dated Jul. 18, 2019, 32 Pages.
"Final Office Action Issued in U.S. Appl. No. 15/630,761", dated Oct. 2, 2019, 20 Pages.

* cited by examiner

VARIABLE RELINEARIZATION IN HOMOMORPHIC ENCRYPTION

BACKGROUND

Cloud-based storage and on-line services are readily available and continue to develop rapidly. Enterprise customers, such as in the medical and financial sectors, save money and streamline business processes by outsourcing the storage and computation of their data to public storage, such as provided by cloud-based services. Instead of storing and managing a large amount of data locally, a medical service provider, for example, can utilize cloud storage for electronic medical records of patient data, and a financial service provider can utilize the cloud storage for financial data and customer records. However, using public cloud-based storage can potentially expose data, compromising the privacy and security of the personal medical, financial, and other sensitive data.

One effective technique is to store private and sensitive data in an encrypted form in the public cloud-based storage, and perform computations on the encrypted data directly. However, typical block ciphers do not allow encrypted data to be used in encrypted form, and meaningful computation on the encrypted data would either require it to be returned to the owner of the data for decryption, or alternatively, for the cloud-based storage service to have access to the decryption key. Homomorphic encryption refers to encryption schemes used to encrypt data in a way that allows evaluating Boolean or arithmetic circuits on the data while it remains encrypted. Homomorphic encryption may also refer to encryption schemes with less capabilities, such as for performing only additions or only multiplications on the encrypted data. However, the conventional techniques used to evaluate homomorphic encrypted data are significantly less efficient than operating on unencrypted data, such as if the data is returned to the owner of the data for decryption.

SUMMARY

This Summary introduces features and concepts of variable relinearization in homomorphic encryption, which is further described below in the Detailed Description and/or shown in the Figures. This Summary should not be considered to describe essential features of the claimed subject matter, nor used to determine or limit the scope of the claimed subject matter.

Variable relinearization in homomorphic encryption is described. In aspects, a computing device stores homomorphic encrypted data as a dataset, and implements an encryption application that can perform a multiplication operation on a ciphertext in the homomorphic encrypted data of the dataset, where the multiplication operation contributes to increase a noise component in the ciphertext. The encryption application can determine a relinearization amount by which to relinearize the ciphertext after the multiplication operation. The relinearization amount is determined effective to optimize a noise increase in the ciphertext attributable to relinearizing the ciphertext and based in part on projected subsequent multiplication operation on the ciphertext. The encryption application can then relinearize the ciphertext utilizing the determined relinearization amount that optimizes the noise increase in the ciphertext, such as for optimal relinearization performance.

In other aspects of variable relinearization in homomorphic encryption, the encryption application is implemented to estimate a noise level in the ciphertext based on an initial noise component in the ciphertext and based on the noise increase to the noise component from the multiplication operation. The encryption application can then determine the relinearization amount by which to relinearize the ciphertext based on the estimated noise level in the ciphertext. The relinearization amount can be determined to be not greater than a current noise level in the ciphertext. The current noise level in the ciphertext is based on the initial noise component in the ciphertext and the noise increase to the noise component from the multiplication operation. The encryption application is implemented to estimate the noise increase of the noise component based on a type of the ciphertext multiplication operation and input parameters of the multiplication operation. In an implementation, the encryption application can determine the relinearization amount as a size of evaluation keys of an encryption scheme used to generate the homomorphic encrypted data. The determination of the size of the evaluation keys is effective to optimize the noise increase in the ciphertext resulting from the relinearization.

BRIEF DESCRIPTION OF THE DRAWINGS

Aspects of variable relinearization in homomorphic encryption are described with reference to the following Figures. The same numbers may be used throughout to reference like features and components that are shown in the Figures.

DETAILED DESCRIPTION

Figure 1:
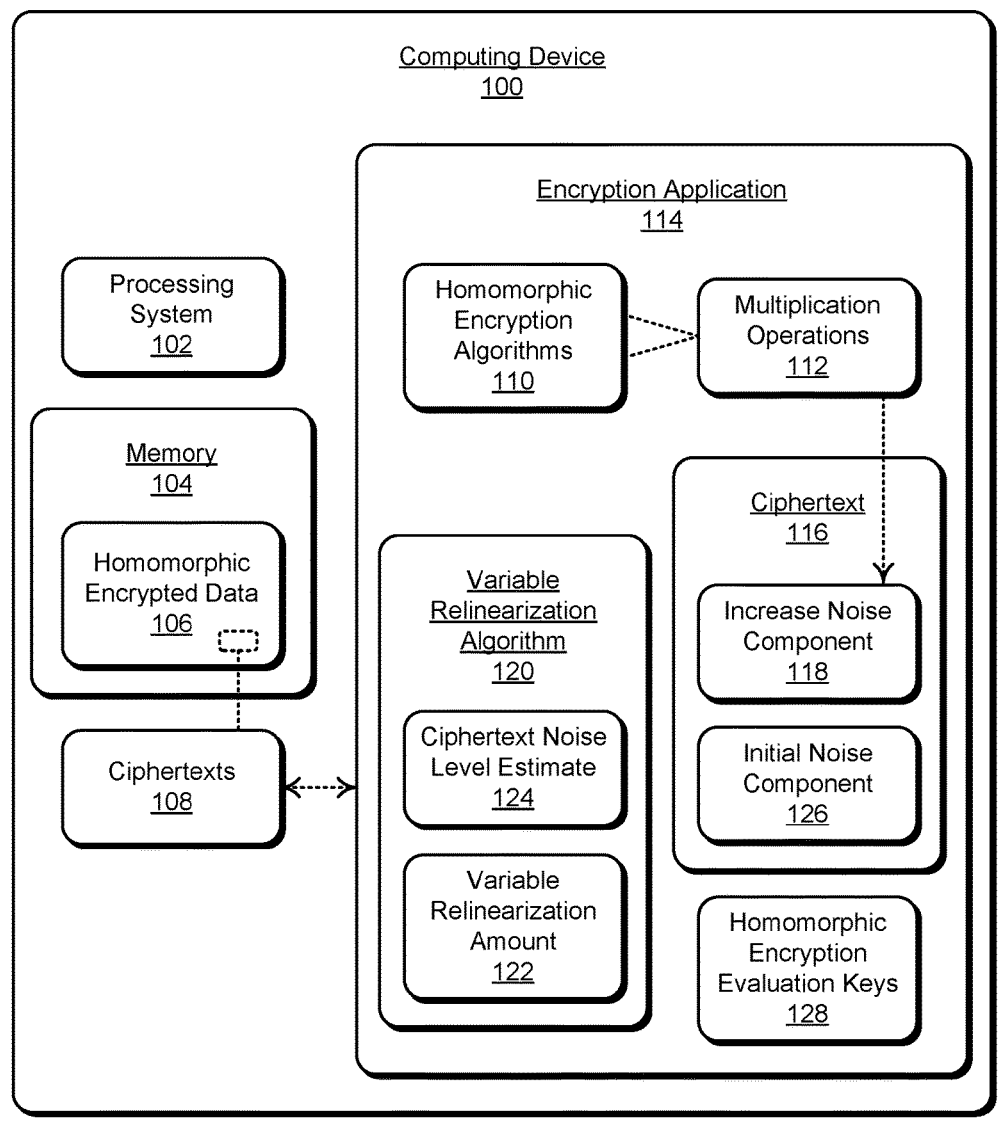
FIG. 1 illustrates an example computing device in which aspects of variable relinearization in homomorphic encryption can be implemented as described herein.

Aspects of variable relinearization in homomorphic encryption are described, such as to implement techniques for relinearizing ciphertexts in homomorphic encrypted data after multiplication operations. Generally, homomorphic encryption can be used to encrypt data in a way that allows computations to be performed on the encrypted data without decrypting it, such as evaluating Boolean or arithmetic circuits on the encrypted data while it remains encrypted. Utilizing homomorphic encryption has applications in privacy-preserving data analysis. However, in homomorphic encrypted data, the ciphertexts contain a noise component, which increases when computations, such as multiplication operations, are performed on the ciphertexts. Once the noise component in a ciphertext reaches a certain bound, the ciphertext can become corrupted to the point that it cannot be decrypted accurately, and the data is lost. Thus, the noise growth in a ciphertexts is a limiting factor in the number of computations that can be performed on a ciphertext.

A technique that is used to control the noise increase, also referred to as the noise growth in ciphertexts, is relinearization. However, relinearization itself also adds noise to a ciphertext that is being relinearized, while at the same time optimizing the noise increase in further operations. As described herein, the relinearization of a ciphertext can be variable to approximate or match the noise component in the ciphertext, and the variable relinearization amount is based on the current noise component of the ciphertext. The relinearization by variable amounts results in noise growth that minimizes a change in the quality of the ciphertext at the time when relinearization is performed. The variable relinearization controls how much noise is added in relinearization of a ciphertext, thus resulting in a smaller overall noise, allowing additional homomorphic operations to be performed on the ciphertext. In aspects of variable relinearization in homomorphic encryption, the relinearization of a ciphertext by variable amounts can be based on the past and the future of the computation that is to be performed on the ciphertext to optimize the overall noise increase.

Aspects of variable relinearization are implemented to optimize the noise component in ciphertexts, and can include not only minimizing noise increase in a ciphertext, but also by determining to add noise to the noise component of the ciphertext. The variable relinearization can be performed in a way that adds almost no noise to a ciphertext, but this lends to slow processing. A trade-off of performing relinearization faster is that more noise may be added to the noise component of the ciphertext. However, based on a determination of the amount of relinearization effective to optimize the noise component in the ciphertext, an optimally larger amount of noise increase may be determined for optimal relinearization performance. In some instances where relinearization performance is a critical aspect, and if there is available space for noise increase at the end of a computation, the relinearization can be performed to add as much noise as possible to the noise component of a ciphertext, which will be the fastest performance. It should also be noted that relinearization performance can be determined across multiple executions of relinearization, taking into account the overall performance of a computation, and not necessarily just evaluating each individual relinearization.

While features and concepts of variable relinearization in homomorphic encryption can be implemented in any number of different devices, systems, networks, environments, and/or configurations, aspects of variable relinearization in homomorphic encryption are described in the context of the following example devices, systems, and methods.

FIG. 1 illustrates an example computing device 100 in which aspects of variable relinearization in homomorphic encryption can be implemented. The computing device 100 can be implemented with various components, such as a processing system 102 and memory 104 (e.g., non-volatile, physical memory), and with any number and combination of different components as further described with reference to the example device shown in FIG. 5. In implementations, the processing system 102 may include multiple and/or different processors, such as a microprocessor, a separate graphics processor, and/or a separate high-speed, dedicated processor.

In this example, homomorphic encrypted data 106 is stored in the memory 104, such as a dataset of homomorphic encrypted data of ciphertexts 108. The homomorphic encrypted data 106 can include N (bit) strings of some length L, all of which are encrypted using homomorphic encryption to encrypt one bit of the data at a time. The encrypted bits in the dataset of homomorphic encrypted data 106 can be denoted as $R_{\{1,1\}}, \ldots R_{\{N,L\}}$, in rows and columns of the encrypted bits.

The techniques of variable relinearization in homomorphic encryption are described in the general context of evaluating the homomorphic encrypted data 106, and homomorphic encryption algorithms 110 are applied to evaluate the homomorphic encrypted data in the dataset while the data remains encrypted. In this example, the homomorphic encryption algorithms 110 apply multiplication operations 112 on the ciphertexts 108 of the homomorphic encrypted data. The multiplication operations 112 on the ciphertexts 108 initiate the need for relinearization, and as described herein, can be implemented as variable relinearization in homomorphic encryption.

The computing device 100 implements the encryption application 114 that can include various algorithms to implement the techniques of variable relinearization in homomorphic encryption, as described herein. The application and algorithms can be implemented as software applications or modules, such as computer-executable software instructions that are executable with the processing system 102. The encryption application 114 can be stored in computer-readable storage memory (e.g., the memory 104), such as any suitable memory device or electronic data storage implemented in the computing device. Further, although the various algorithms are shown and described as modules of the encryption application 114, any one or combination of the algorithms may be implemented separately or together, and may be independent of the encryption application. An overview of the encryption application 114 and the various algorithms is described following, with additional implementation details described with reference to FIG. 2.

In aspects of variable relinearization in homomorphic encryption, the encryption application 114 can apply one or more of the various algorithms 110 to perform homomorphic operations, such as the multiplication operations 112, on the ciphertexts 108 of the homomorphic encrypted data 106. As noted above, generally the multiplication operations 112 that are performed by the homomorphic encryption algorithms 110, or by other multiplication operations on the ciphertexts 108, increase the noise component in a ciphertext. As the noise component of a ciphertext increases, computation processing becomes slow, and further, once the noise component in a ciphertext reaches a certain bound, the ciphertext can become corrupted to the point that it cannot be decrypted accurately, and the data is lost. Aspects of variable relinearization in homomorphic encryption can be implemented to relinearize the ciphertexts 108, and doing so in a manner effective to minimize or optimize the noise increase in the ciphertexts that is attributable to the multiplication operations 112 and/or relinearizing the ciphertexts.

For example, in many encryption schemes that utilize homomorphic encryption, such as the Fan-Vercauteren (FV) scheme described herein, newly encrypted ciphertexts 108 consist of two polynomials in $R_q$. When multiplication on ciphertexts of size M and size N is performed, the resulting ciphertext has size M+N−1 (e.g., two newly encrypted ciphertexts multiply to a ciphertext of size three (3)). With consecutive multiplication operations 112, the ciphertext 108 grows in size very quickly, which makes operating on the ciphertext very slow. Additionally, noise growth gets worse as the size of the ciphertexts increases, so multiplying ciphertexts of a size five (5) for instance becomes nonsensical. Relinearization brings down the size of a ciphertext to the lower bound of two (2). Thus, relinearization controls the size of the ciphertexts, and smaller size ciphertexts incur less noise due to multiplication operations and are faster to process.

The encryption application 114 can perform a multiplication operation 112 on a ciphertext 116 in the homomorphic encrypted data 106 of the dataset, and the multiplication operation 112 contributes to increase a noise component 118 in the ciphertext. In this example, the encryption application 114 includes a variable relinearization algorithm 120 that is implemented to determine a variable relinearization amount 122 by which to relinearize the ciphertext 116 after the multiplication operation 112. The relinearization amount 122 is determined to optimize a noise increase in the ciphertext 116 that is attributable to relinearizing the ciphertext, and the optimization can be based in part on projected subsequent multiplication operations 112 on the ciphertext 116. The encryption application 114 can then relinearize the ciphertext 116 utilizing the determined variable relinearization amount 122 that optimizes the noise increase in the ciphertext for optimal relinearization performance.

Additionally relinearization performance can be determined across multiple executions of relinearization, taking into account the overall performance of a computation, and not necessarily just evaluating each individual relinearization. For example, a computation may be homomorphic multiplication of two-component ciphertexts in the form $d_1*_{c1}+d_2*_{c2}+\ldots+d_{10}*_{c10}$, where each term in the sum will be a three-component ciphertext. Rather than relinearizing the ten (10) individual multiplication results, computing instead the sums of the three-component ciphertexts is very fast. Once the sum has been computed, which still results in a three-component ciphertext, it can be relinearized. In this example, the computational cost goes down by nine (9) relinearizations, but the additions become slightly slower, which is irrelevant as they are very fast compared to the relinearizations.

In other aspects of variable relinearization in homomorphic encryption, the variable relinearization algorithm 120 of the encryption application 114 is implemented to estimate a noise level in the ciphertext 116 as the ciphertext noise level estimate 124 based on an initial noise component 126 in the ciphertext 116 and based on the noise increase to the noise component 118 contributed by the multiplication operation 112. The variable relinearization algorithm 120 of the encryption application 114 can then determine the variable relinearization amount 122 by which to relinearize the ciphertext 116 based on the ciphertext noise level estimate 124. In an implementation, the variable relinearization amount 122 can be determined to be not greater than the current noise level in the ciphertext 116.

In an illustrative example, a newly encrypted ciphertext 108 has some noise component, such as represented by some ten (10) bit number, and may have a noise ceiling of two-hundred (200) bits. For simplicity, assume that every multiplication operation 112 adds thirty (30) bits of noise (e.g., a multiplicative increase by some factor $\sim 2^{30}$). Accordingly, after one multiplication operation, the noise is a forty (40) bit number. A relinearization incurs an additive term, which generally can be of any size depending on the performance target. At its smallest, the noise increase could be some eight (8) bit number, which adding a number $2^8$ to a number $2^{40}$, this noise increase is completely irrelevant (particularly given that the ceiling is $2^{200}$ in this example). Even if the additive term is $\sim 2^{40}$, the change is nearly irrelevant compared to the two-hundred (200) bit ceiling. The new level of the noise component may be at most $\sim 2^{41}$ for a mere one (1) bit increase.

However, to achieve better performance, the encryption application 114 can be implemented to relinearize by some much larger amount, so that the additive term is $2^{80}$, resulting in approximately $2^{80}+2^{40}=2^{80}$. Another multiplication operation 112 can be performed and the noise is then approximately one-hundred ten (110) bits. At this point, there will be no change in the noise component if the ciphertext is relinearized, and there is no change in the noise, as approximately $2^{80}+2^{110} \approx 2^{110}$. A subsequent multiplication can be performed, followed by a relinearization using much faster evaluation keys 128. For example, a relinearization may add one-hundred sixty (160) bits of noise, which is going to be much faster than the eighty (80) bit relinearization, and at the one-hundred sixty (160) bits, another multiplication operation 112 can be performed, which increases the noise component of the ciphertext to one-hundred ninety (190) bits. The ciphertext will still decrypt correctly, and the result is a three-component ciphertext.

A determination can then be made not to relinearize if no subsequent multiplication operations 112 are to be performed (but relinearization could be performed and it would be very fast processing because a very large amount of noise can be added at this point without change). In implementations, the size of the homomorphic encryption evaluation keys 128 do not change, which in practice is a vector of polynomials with coefficients of a certain size. If the coefficients are large, then the vector of polynomials is shorter (length two (2) is the minimum), and this is the case where a lot of noise is added but the computation is fast. On the other end, the coefficients can be very small (0 or 1), and the vector of polynomials can be very long, which adds very little noise, but results in very slow performance. In any case, the total size of the homomorphic encryption evaluation keys 128 is approximately always the same, and it is efficient to store fewer polynomials with larger coefficients.

The current noise level in the ciphertext 116 is based on the initial noise component 126 in the ciphertext and the noise increase to the noise component 118 from a multiplication operation 112. The encryption application 114 can be implemented to estimate the noise increase of the noise component 118 based on a type of the ciphertext multiplication operation and input parameters of the multiplication operation. For example, a Table 2 is included in details below, and the table includes homomorphic operations, and an input description for each, from which noise estimates for the homomorphic operations can be determined as an associated output noise.

In an implementation, the variable relinearization algorithm 120 of the encryption application 114 can determine the variable relinearization amount 122 as a size of the homomorphic encryption evaluation keys 128 of the encryption scheme used to generate the homomorphic encrypted data 106. The determination of the size of the homomorphic encryption evaluation keys 128 is effective to optimize the noise increase from the noise increase in the ciphertext 116 resulting from the relinearization. The technique of variable relinearization reduces the size of the ciphertexts down to (at least) two (2) polynomials, and utilizes the homomorphic encryption evaluation keys 128. The relinearization itself increases the noise in the ciphertext 116 by an amount that depends on the size of the evaluation keys 128. This size can be a user-selectable variable, and the smaller the evaluation keys 128 (for a larger noise increase), the faster the relinearization will be performed.

Initially, when the initial noise component 126 of the ciphertext 116 is still small, the encryption application 114 can initiate to relinearize the ciphertext 116 by large size evaluation keys 128, which results in relatively slow processing, but adds little noise to the ciphertext 116. When the noise level of the noise component in the ciphertext 116 increases, the encryption application 114 can initiate to relinearize by larger size evaluation keys 128, which results in relatively faster processing, and the added noise drowns into the already large noise in the ciphertext. This provides for a better performing encryption scheme and allows more homomorphic operations to be performed on the homomorphic encrypted data 106.

Therefore, the size of the evaluation keys 128 can be selected or chosen to be as small as possible, without making the noise growth (e.g., the noise increase of the noise component 118) from the relinearization too large. Since relinearization increases the noise in the ciphertexts 108 by an additive factor, if the ciphertext 116 already contains a larger or equal size noise, the additional noise will drown into the existing noise and will not cause the ciphertext 116 to degrade in quality by any noticeable amount, as described above. Therefore, in aspects of variable relinearization in homomorphic encryption, one technique can be to relinearize by variable size evaluation keys 128, depending on what the current noise level is estimated to be in the ciphertext 116.

Figure 2:
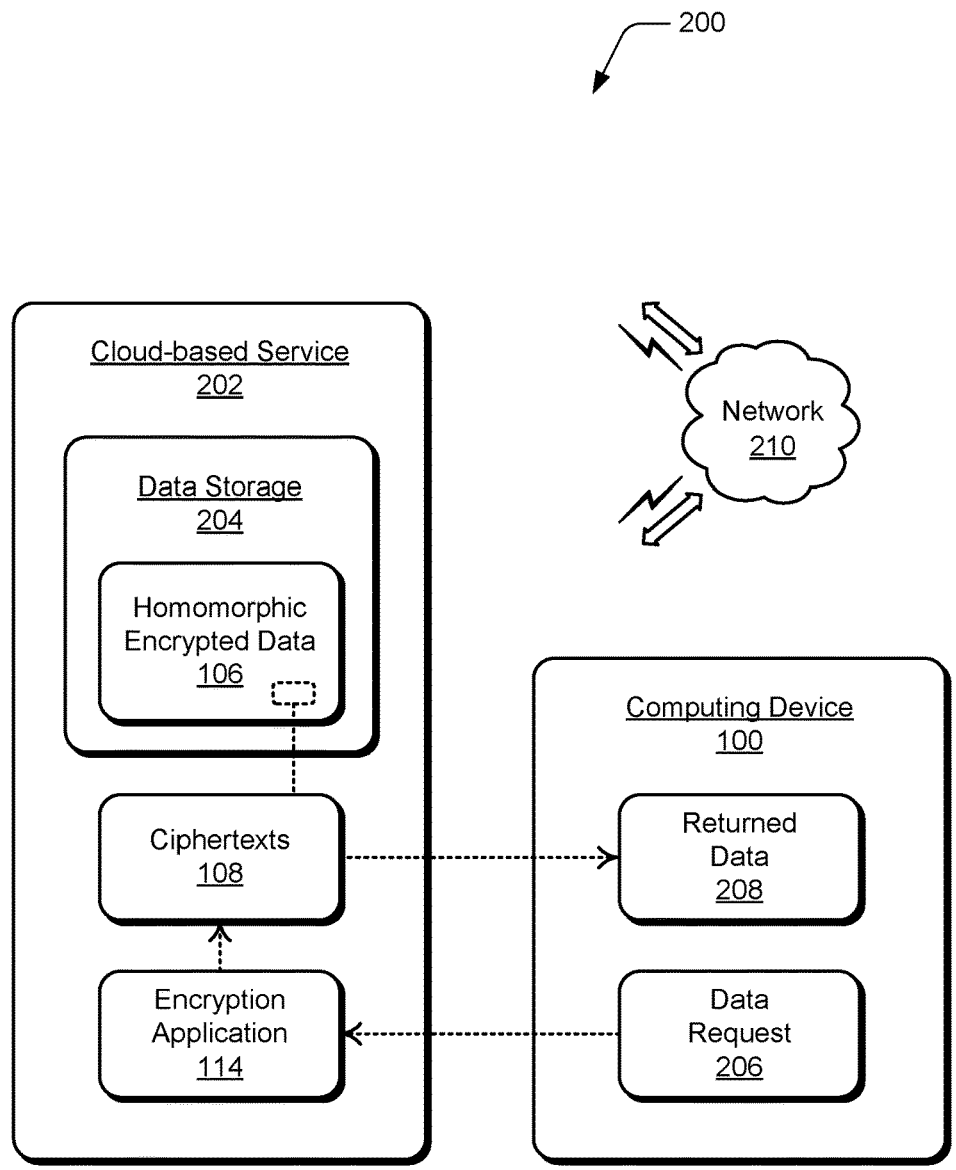
FIG. 2 illustrates an example system in which aspects of variable relinearization in homomorphic encryption can be implemented as described herein.

FIG. 2 illustrates an example system 200 in which aspects of variable relinearization in homomorphic encryption can be implemented as described herein. The example system 200 includes the computing device 100 that is shown and described with reference to FIG. 1. The example system also includes a cloud-based service 202 that is accessible by computing devices, to include the computing device 100. The cloud-based service 202 includes data storage 204 that may be implemented as any suitable memory, memory device, or electronic data storage for network-based storage. The data storage 204 can store the homomorphic encrypted data 106. The cloud-based service 202 can also implement an instance of the encryption application 114, as shown and described with reference to FIG. 1.

In this instance, the encryption application 114 can receive a data request 206 from the computing device 100, such as a query of the homomorphic encrypted data 106 in the dataset. The encryption application 114 can then apply one or more of the various homomorphic encryption algorithms 110 shown and described with reference to FIG. 1, performing the multiplication operations 112. The encryption application 114 can also apply the described efficiencies and techniques of variable relinearization in homomorphic encryption. The encryption application 114 can process and determine the requested data 206 from the homomorphic encrypted data 106, and the requested data can then be returned to the computing device 100 as the returned data 208.

The cloud-based service 202 can also be implemented with server devices that are representative of one or multiple hardware server devices of the service. Further, the cloud-based service 202 can be implemented with various components, such as a processing system and memory, as well as with any number and combination of different components as further described with reference to the example device shown in FIG. 5 to implement the services, applications, servers, and other features of variable relinearization in homomorphic encryption. Other aspects of variable relinearization in homomorphic encryption as described herein can be implemented by the encryption application 114 at the cloud-base service and/or may be implemented in conjunction with the encryption application 114 that is implemented by the computing device 100, as shown and described with reference to FIG. 1.

The example system 200 also includes a network 210, and any of the devices, servers, and/or services described herein can communicate via the network, such as for data communication between the computing device 100 and the cloud-based service 202. The network 210 can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Homomorphic Encryption

Homomorphic encryption is a powerful cryptographic technique that allows computation on encrypted data without first decrypting it. Even though anyone can operate on the encrypted data, the results of the operations remain encrypted, and no information about the underlying plaintext is leaked, except perhaps its size. In examples, a medical service provider may want to outsource the storage of encrypted medical data files for public cloud-based storage, such as at the cloud-based service 202 with the data storage 204. Similarly, a financial service provider may want to outsource the storage of encrypted financial data files for public cloud-based storage.

In order to protect the privacy of the patients of the medical service provider, and protect the privacy of the customers of the financial service provider, the respective medical data files and the financial data files are uploaded to the cloud-based service 202 for storage in encrypted form, such as the homomorphic encrypted data 106 in a dataset. At a later date, the medical service provider or the financial service provider may want to request and/or update the encrypted data that has been uploaded to the cloud-based storage. The computing device 100 is representative of an entity accessing or initiating a request of the homomorphic encrypted data 106 that has been stored as a dataset in the data storage 204 at the cloud-based service 202. A data request 206 or data update can be communicated from the medical service provider or the financial service provider in an encrypted form to protect the privacy of the respective patients and customers.

Generally, the techniques and algorithms of variable relinearization in homomorphic encryption as described herein are agnostic to the encryption scheme that is being used for homomorphic encryption. However for simplicity, the discussion centers on Ring-LWE (learning with error)-based cryptosystems using power-of-2 cyclotomic rings of integers. This is described in a document "On ideal lattices and learning with errors over rings" by Lyubashevsky et al. (Advances in Cryptology—EUROCRYPT 2010, $29^{th}$ Annual International Conference on the Theory and Applications of Cryptographic Techniques, French Riviera, May 30-Jun. 3, 2010. Proceedings, volume 6110 of Lecture Notes in Computer Science, pages 1-23. Springer, 2010). In such cryptosystems, the plaintext space is typically the polynomial quotient ring $Z_t[x]/(x^n+1)$, and the ciphertext space is the polynomial quotient ring $Z_q[x]/(x^n+1)$, where n is a power of 2, and t«q are integers. Here $Z_t$ and $Z_q$ denote integers modulo t and q, respectively. Thus, it is customary to denote $R=Z[x]/(x^n+1)$, so that the plaintext and ciphertext spaces become $R_t=R/tR$, and $R_q=R/qR$, respectively. In implementations, the techniques described herein can utilize the Simple Encrypted Arithmetic Library (SEAL version of the library v2.1), which implements the Fan-Vercauteren scheme. Thus, the techniques also may apply trivially to many other encryption schemes that are used for homomorphic encryption.

As a distinction, fully homomorphic encryption refers to an encryption scheme which can evaluate any arithmetic circuit on encrypted inputs, but in practice, is extensive to implement. Rather, by restricting the multiplicative depth of the circuits to some bound L, the parameters of the encryption scheme can be set to support only circuits up to depth L, and significantly better performance is obtained with this "leveled fully" homomorphic encryption scheme, rather than the result of using a true fully homomorphic encryption scheme. The leveled fully homomorphic encryption scheme can be described by randomized algorithms, which include Setup, KeyGen, Encrypt, Decrypt, and Evaluate algorithms.

Given a security parameter K and a parameter $L \in Z^+$ (level), the Setup($1^\kappa$, $1^L$) outputs a set of encryption parameters parms. The KeyGen(parms) outputs a secret key sk and a public key pk, and optionally, outputs one or more evaluation keys evk. Given a message $m \in R_t$, the Encrypt(m, pk) outputs ciphertext $c \in R_q$. Given the ciphertext $c \in R_q$, the Decrypt(c, sk) outputs a message $m \in R_t$. For the Evaluate(C, (c1, ..., $c_k$), evk): Given a circuit f of depth at most L with k input wires, and inputs c1, ..., $c_k$, with $c_i \rightarrow$Encrypt($m_i$, pk), outputs a ciphertext c such that Pr [Decrypt(c, sk)$\neq$f ($m_1$, ..., $m_k$)]=negl($\kappa$). Additionally, the size of the output of Evaluate is not more than a polynomial in $\kappa$ independent of f (compactness), and independent of L. The leveled fully homomorphic encryption scheme is secure if its IND-CPA secure.

With reference to encoding, the techniques described herein restrict to encryption schemes for homomorphic encryption where the plaintext space is the polynomial quotient ring $R_t$. Thus, when integers are to be encrypted, and integer arithmetic performed on them in encrypted form, an encoding scheme is used to convert integers into elements of $R_t$. There are many ways to do this, however the simplest and easiest method can be utilized for variable relinearization in homomorphic encryption. Given an integer $m \in Z$, it is encoded as the constant polynomial $m \in R_t$, allowing for only encoding integers between zero (0) and t-1, which provides a strict lower bound on the size of t that can be used. Because $Z_t$ is a subring of $R_t$, as long as the coefficients of the underlying plaintext polynomials that are encountered during the homomorphic evaluation never get reduced modulo t, the homomorphic encryption scheme can be used to perform integer arithmetic. This can place a strong lower bound on the size of t, which subsequently necessitates the use of larger n and q, meaning that t should be chosen to be as small as possible.

Relinearization Overview

As described herein, relinearization pertains not only to the FV scheme, but also to the particular implementation of SEAL as described below. With reference to relinearization, to obtain and maintain cryptographic properties (e.g., compactness and circuit privacy) of the homomorphic encrypted data 106, a relinearization operation can be performed by the encryption application 114 after every homomorphic multiplication operation 112. The result of multiplying two ciphertexts of sizes M and N results in a ciphertext of size M+N-1. Relinearization can then be initiated to reduce the size down from three (3) to two (2) after each multiplication operation, preventing the ciphertext size from leaking information about the evaluated arithmetic circuit.

However, the encryption application 114 does not perform relinearization by default after each homomorphic multiplication. A function Evaluator::multiply of the object Evaluator can return a ciphertext of size M+N-1 (given inputs of M and N), and subsequent relinearization can be performed using a function Evaluator::relinearize. Although relinearization after every multiplication operation is a good strategy, it may not always be optimal or necessary, and in some cases, additional performance may be obtained by deferring relinearization until after a later operation and instead, performing homomorphic operations on larger ciphertexts. The function Evaluator::multiply is C++ notation and refers specifically to the SEAL implementation of the FV scheme described herein. In aspects of the described variable relinearization, the relinearization is not done after every multiplication automatically, but many other libraries do perform this function. In implementations, relinearization reduces a ciphertext of arbitrary size down to any size at least two (2) (by default to size two (2)). Relinearization can reduce the size down from M+N-1 to any size at least size two (2), but this is done in steps, reducing size down one step at a time.

Another reason for not relinearizing by default is that the performance of the function Evaluator::relinearize depends on the choice of the parameter decomposition_bit_count in EncryptionParameters. A reasonable choice for the decomposition bit count is between ⅕ and ½ of the significant bit count of the coefficient modulus, but since it affects both ciphertext noise growth and performance, the optimal choice is not specifically determinable without knowing the details of the particular computation. However, the choice of the decomposition bit count does not matter if there will be no relinearization in the computation, and since relinearization does not occur by default, the constructor of EncryptionParameters can set it automatically to zero (0) (signaling that no relinearization will be performed). Some of the notation and terminology used herein is very specific to the described implementation, but can be expanded for applicability to other encryption schemes.

To be able to relinearize a ciphertext, the owner of the secret key must have generated enough evaluation keys that need to be subsequently given as input to the constructor of object Evaluator. More precisely, if a ciphertext has a size equal to K, then K-2 evaluation keys will be needed to relinearize it down to any size less than K. To generate k-evaluation keys with the key generator, the owner of the secret key can call KeyGenerator::generate with the parameter k. If the key generator is instantiated with a decomposition bit count of zero (0) as above, then the generate function can only be called with parameter k=0 as the default value. If no evaluation keys have been generated, the Evaluator can be constructed by only passing it a set of encryption parameters. If the Evaluator is constructed in such a way, then it will not be possible to use the function Evaluator::relinearize. To then perform relinearization, the decomposition bit count is set to a non-zero value, an appropriate number of evaluation keys are generated with KeyGenerator::generate, and the generated EvaluationKeys instance is passed to the constructor of Evaluator.

FV Scheme and Encoding

With reference to plaintext space and encodings in the Fan-Vercauteren (FV) scheme, the plaintext space is $R_t = Z_t [x]/(x^n+1)$ as polynomials of degree less than n with coefficients modulo t. The ring structure in $R_t$ is used so that a product of two plaintext polynomials becomes the product of the polynomials with $x^n$ being converted everywhere to a -1. The homomorphic addition and multiplication operations on ciphertexts will carry through the encryption to addition and multiplication operations in $R_t$. For example, to encrypt an integer or a rational number, it is first encoded into a plaintext polynomial in $R_t$, and can be encrypted only after that. To also be able to compute addition and multiplication operations on the integers in encrypted form, the encoding is such that the addition and multiplication of encoded polynomials in $R_t$ carry over correctly to the integers when the result is decoded.

Table 1 below indicates notations used herein:

TABLE 1

Notations

| Parameter | Description |
|---|---|
| q | Modulus in the ciphertext space (coefficient modulus) |
| t | Modulus in the plaintext space (plaintext modulus) |
| n | A power of 2 |
| $x^n + 1$ | The polynomial modulus which specifies the ring R |
| R | The ring $Z[x]/(x^n + 1)$ |
| $R_a$ | The ring $Z_a[x]/(x^n + 1)$, same as the ring R but with coefficients reduced modulo a |
| w | A base into which ciphertext elements are decomposed during relinearization |
| log w | The decomposition bit count. Here log means log2. |
| l | There are $l + 1 = \lfloor \log_w q \rfloor + 1$ elements in each component of each evaluation key |
| δ | Expansion factor in the ring $R(\delta \leq n)$ |
| Δ | Quotient on division of q by t, or $\lfloor q/t \rfloor$ |
| $r_t(q)$ | Remainder on division of q by t (i.e., $q = \Delta t + r_t(q)$, where $0 \leq r_t(q) < t$ |
| χ | Error distribution (a truncated discrete Gaussian distribution) |
| σ | Standard deviation of χ |
| B | Bound on the distribution χ |

In the ciphertext space, the ciphertexts in the FV scheme are arrays of polynomials in $R_q$. These arrays can contain at least two polynomials, but grow in size in homomorphic multiplication operations unless relinearization is performed. Homomorphic additions are performed by computing a component-wise sum of these arrays, but multiplications are more complicated.

In implementations, λ is the security parameter, w is a base, and $l+1=\lfloor \log_w q \rfloor +1$ denotes the number of terms in the decomposition into base w of an integer in base q. The polynomials in $R_q$ are decomposed into base-w components coefficient-wise, resulting in l+1 polynomials. The notation $$a \xleftarrow{\$} S$$

denotes that a is sampled uniformly from the finite set S. The FV scheme includes the algorithms SecretKeyGen, PublicKeyGen, EvaluationKeyGen, Encrypt, Decrypt, Add, and Multiply, as described below:

SecretKeyGen(λ): Sample $$s \xleftarrow{\$} R_2$$

and output sk=s.

PublicKeyGen(sk): Set s=sk, sample $$a \xleftarrow{\$} R_q,$$

and e←χ.
Output pk=$([-(as+e)]_q, a)$.

EvaluationKeyGen(sk, w): for i∈{0, . . . , l}, sample $$a_i \xleftarrow{\$} R_q,$$

e←χ.
Output evk=$([-(a_i s+e_i)+w^i s^2]_q, a_i)$.
Encrypt(pk, m): for m∈$R_t$, let pk=$(p_0, p_1)$, sample $$u \xleftarrow{\$} R_2,$$

& $e_1, e_2$←χ.
Compute ct=$([\Delta m+p_0 u+e_1]_q, [p_1 u+e_2]_q)$.
Decrypt(sk, ct): set s=sk, $c_0$=ct[0], and $c_1$=ct[1].

Output $\left[\left\lfloor \frac{t}{q}[c_0 + c_1 s] \right\rceil_q\right]_t$.

Add($ct_0$, $ct_1$): output ($ct_0[0]+ct_1[0]$, $ct_0[1]+ct_1[1]$).
Multiply($ct_0$, $ct_1$): Compute $$c_0 = \left[\left\lfloor \frac{t}{q} ct_0[0]ct_1[0] \right\rceil \right]_q$$

$$c_1 = \left[\left\lfloor \frac{t}{q} (ct_0[0]ct_1[1] + ct_0[1]ct_1[0]) \right\rceil \right]_q$$

$$c_2 = \left[\left\lfloor \frac{t}{q} ct_0[1]ct_1[1] \right\rceil \right]_q$$

Express $c_2$ in base w as $c_2 = \sum_{i=1}^{l} c_2^{(i)} w^i$ and set $$c_2 = \sum_{i=1}^{l} c_2^{(i)} w^i$$

and set $$c_0' = c_0 + \sum_{i=0}^{l} evk[i][0] c_2^{(i)}$$

$$c_1' = c_1 + \sum_{i=0}^{l} evk[i][1] c_2^{(i)}$$

and output ($c_0'$, $c_1'$),

Simple Encrypted Arithmetic Library (SEAL)

In practice, some operations in SEAL are performed slightly differently, or in slightly more generality, than in the FV scheme. To clarify the generalization of FV operations, it is convenient to think of each ciphertext component as corresponding to a particular power of the secret key s. In particular, in a ciphertext ct=$(c_0, c_1, \ldots, c_k)$ of size k+1, the $c_0$ term is associated with $s^0$, the $c_1$ term with $s^1$, and so on, so that the $c_k$ term is associated with $s^k$.

A ciphertext ct=$(c_0, \ldots, c_k)$ is decrypted by computing $$\left[\left\lfloor \frac{t}{q}[ct(s)] \right\rceil_q\right]_t = \left[\left\lfloor \frac{t}{q}[c_0 + \cdots + c_k s^k] \right\rceil_q\right]_t$$

This generalization of decryption is handled automatically. The decryption function determines the size of the input ciphertext, and generates the appropriate powers of the secret key which are required to decrypt it. Note that because well-formed ciphertexts of arbitrary length are considered valid, the compactness property of homomorphic encryption is automatically lost. Generally, compactness states that the decryption circuit should not depend on ciphertexts, or on the function being evaluated.

With reference to multiplication and the Multiply function, the first step that outputs the intermediate ciphertext $(c_0, c_1, c_2)$ defines a function implemented as Evaluator::multiply_norelin, and causes the ciphertext to grow in size. The second step defines a relinearization function, implemented as Evaluator::relinearize, which takes a ciphertext of size three (3) and an evaluation key, and produces a ciphertext of size two (2), encrypting the same underlying plaintext. Note that the ciphertext $(c_0, c_1, c_2)$ can already be decrypted to give the product of the underlying plaintexts so that the relinearization step is not necessary for correctness of homomorphic multiplication.

It is possible to repeatedly use a generalized version of the first step of the Multiply function to produce even larger ciphertexts to further avoid relinearization. In particular, $ct_1=(c_0, c_1, \ldots, c_j)$ and $ct_2=(d_0, d_1, \ldots, d_k)$ are two ciphertexts of sizes j+1 and k+1, respectively. The ciphertext output of Multiply($ct_1$, $ct_2$), which is of size j+k+1, is denoted as $ct_{mult}=(C_0, C_1, \ldots, C_{j+k})$. The polynomials $C_m \in R_q$ are computed as:

$$C_m = \left[\left[\frac{t}{q}\left(\sum_{r+s=m} c_r d_s\right)\right]\right]_q.$$

In SEAL, function Multiply (or a family of functions) is defined to mean this generalization of the first step of multiplication, implemented as Evaluator::multiply.

Relinearization

The goal of relinearization is to decrease the size of a ciphertext back to (at least) two (2) polynomials after the ciphertext has been increased by multiplications as described above. Given a size k+1 ciphertext $(c_0, \ldots, c_k)$ that can be decrypted, relinearization can be initiated to generate a ciphertext when applied repeatedly, of any size at least two (2) that can be decrypted using a smaller degree decryption function to yield the same result. This conversion utilizes the evaluation key (or evaluation keys) that are provided to the Evaluator algorithm.

In the FV scheme for homomorphic encryption, a size three (3) ciphertext $(c_0, c_1, c_2)$ can be converted into a size two (2) ciphertext $(c_0', c_1')$ that decrypts to the same result. If given a pair evk=$([-(as+e)+s^2]_q, a)$, where $$a \xleftarrow{\$} R_q,$$

and $e \leftarrow \chi$. The $c_0'=c_0+\text{evk}[0]c_2$, $c_1'=c_1+\text{evk}[1]c_2$, and as above, the output is defined to be the pair $(c_0', c_1')$. Interpreting this as a size two (2) ciphertext and decrypting it yields:

$$c_0'+c_1's=c_0+(-(as+e)+s^2)c_2+c_1s+ac_2s=c_0+c_1s+c_2s^2-ec_2.$$

This is almost what is needed, i.e., $c_0+c_1s+c_2s^2$, except for the additive extra term $ec_2$. However, since $c_2$ has coefficients up to size q, this extra term will make the decryption process fail.

In aspects of variable relinearization in homomorphic encryption, the solution of writing $c_2$ in terms of some smaller base w is used, where $c_2=\Sigma_{i=0}^{l} c_2^{(i)}w^i$. Instead of having just one evaluation key (pair) as above, l+1 pairs are constructed, and instead $c_0'$ and $c_1'$ successively replaces the large additive term that appears in the naive approach above with a term of size linear in w. This same idea can be generalized to relinearizing a ciphertext of any size k+1 to size k≥2, as long as a generalized set of evaluation keys is generated in the EvaluationKeyGen(sk,w) function. Namely, a set of evaluation keys $evk_2$ (corresponding to s2), $evk_3$ (corresponding to $s^3$), and so on up to $evk_k$ (corresponding to $s^k$), each generated as described above. Then relinearization converts $(c_0, c_1, \ldots, c_k)$ into $(c_0', c_1', \ldots, c_{k-1}')$, where:

$$c_0' = c_0 + \sum_{i=0}^{l} evk_k[i][0]c_k^{(i)}$$

$$c_1' = c_1 + \sum_{i=0}^{l} evk_k[i][1]c_k^{(i)}$$

and $c_j'=c_j$ for 2≤j≤k−1.

Note that in order to generate evaluation keys, access to the secret key is needed, and in particular, the evaluating party would not be able to do this. The owner of the secret key of the homomorphic encrypted data must generate an appropriate number of evaluation keys and pass these to the evaluating party in advance of the relinearization computation. This means that the evaluating party should inform the key generating party beforehand whether or not they intend to relinearize, and if so, by how many steps. Note that if they choose to relinearize after every multiplication operation, only one evaluation key $evk_2$ is needed. The function Relinearize (or family of functions) is defined to mean this generalization of the second step of multiplication, and is implemented as Evaluator::relinearize. In the scheme FV for homomorphic encryption, the secret key sk is a polynomial sampled uniformly from $R_2$ (i.e., it is a polynomial with coefficients in {0, 1}. In implementations, the key is now sampled uniformly from $R_3$, using coefficients {−1, 0, 1}.

With reference to the addition operations, addition can be generalized to be able to operate on ciphertexts of any size. Given two ciphertexts $ct_1=(c_0, \ldots, c_j)$ and $ct_2=(d_0, \ldots, d_k)$, encrypting plaintext polynomials $m_1$ and $m_2$, respectively. For WLOG j≤k, then $ct_{add}=([c_0+d_0]_q, \ldots, [c_j+d_j]_q, d_{j+1}, \ldots, d_k)$ encrypts $[m_1+m_2]_t$. Subtraction operations are analogous. The functions Add (or family of functions) are defined to mean this generalization of addition, and is implemented as Evaluator::add. A function Sub for subtraction, which works in an analogous way, is implemented as Evaluator::sub.

With reference to other homomorphic operations, a function Negate is provided to perform homomorphic negation, which is implemented in the library as Evaluator::negate. Functions are also provided for AddPlain(ct, $m_{add}$) and MultiplyPlain(ct, $m_{mult}$) that, given a ciphertext ct encrypting a plaintext polynomial m, and plaintext polynomials $m_{add}$, $m_{mult} \in R_t$, output encryptions of $m+m_{add}$ and $m \cdot m_{mult}$, respectively. When one of the operands in either addition or multiplication does not need to be protected, these operations can be used to improve performance over first encrypting the plaintext and then performing the normal homomorphic addition or multiplication operation. MultiplyPlain also incurs much less noise to the ciphertext than the normal Multiply function, which will allow the evaluator to perform significantly more MultiplyPlain than Multiply operations. These functions are implemented as Evaluator::add_plain and Evaluator::multiply_plain. Analogously to AddPlain, a plaintext subtraction function is implemented as Evaluator::sub_plain.

In many situations, several ciphertexts can be multiplied together homomorphically. The naive sequential way of doing this has very poor noise growth properties, and instead, use a low-depth arithmetic circuit. For homomorphic addition of several values, the exact method for doing so is less important. The functions MultiplyMany and AddMany are defined to multiply together or add together several ciphertexts in an optimal way, and are implemented as Evaluator::multiply_many and Evaluator::add_many. Exponentiating a ciphertext to a non-zero power can be performed using a similar low-depth arithmetic circuit that MultiplyMany uses. A function Exponentiate is defined, which is implemented as Evaluator::exponentiate. As noted, implementations of MultiplyMany and Exponentiate do not involve relinearization and might be slow processing when large products are to be computed. Variants of these functions can be implemented that relinearize either after every multiplication operation, or at least after the first few multiplication operations.

Inherent Noise

As described throughout, the inherent noise, or ciphertext noise, increases in the ciphertexts of the homomorphic encrypted data for homomorphic operations performed on the ciphertexts. Practical estimates can be determined by the SimulationEvaluator and by an automatic parameter selection module (i.e., of the encryption application 114) to determine optimized parameters for computations. Ciphertexts of any size greater than or equal to two (2) are allowed for the computations.

The inherent noise in a ciphertext can be defined for $ct=(c_0, c_1, \ldots, c_k)$ is a ciphertext encrypting the message $m \in R_t$, and the inherent noise $v \in R_q$ is defined to be a polynomial such that $ct(s)=c_0+c_1s+c_ks^k=\Delta m+v+aq$ for some polynomial a. Both v and its norm $\|v\|$ are referred to as the inherent noise, generally focused on the norm $\|v\|$. The quantity $\|v\|$ is output by the function inherent noise, and the symmetric representation modulo q is used for the coefficients of v and their absolute values are used as integers when computing the norm.

Due to a maximal noise, the main result related to inherent noise is that once its coefficients reach a large enough value, the ciphertext becomes corrupted and impossible to decrypt even with the correct secret key. The upper bound on the inherent noise depends on both the coefficient modulus q and the plaintext modulus t. The function (or family of functions) Decrypt correctly decrypts a ciphertext as long as the inherent noise satisfies $\|v\|<\Delta/2$. Considering the ciphertext $ct=(c_0, c_1, \ldots, c_k)$, its decryption m' under a secret key s is defined as:

$$m' = \left[\left[\frac{t}{q}[c_0 + c_1 s + \cdots + c_k s^k]_q\right]\right]_t$$

By definition of inherent noise, $c_0+c_1s+ \ldots +c_ks^k=\Delta m+v$ (mod q), so $$m' = \left[\left[\frac{t(\Delta m + v)}{q}\right]\right]_t = \left[\left[m - \frac{r_t(q)}{q}m + \frac{t}{q}v\right]\right]_t,$$

where $q=\Delta t+r_t(q)$. This means that m'=m in Rt as longs as the terms $-r_t(q)m/q+tv/q$ are removed by the rounding. That is:

$$\left\| -\frac{r_t(q)}{q}m + \frac{t}{1}v \right\| < \frac{1}{2}.$$

Since $$\left\| -\frac{r_t(q)}{q}m + \frac{t}{q}v \right\| \leq \frac{t}{q} \cdot \|m\| + \frac{t}{q}\|v\| \leq \frac{t^2}{q} + \frac{t}{q}\|v\|,$$

suffices to require that $$\frac{t^2}{q} + \frac{t}{q}\|v\| < \frac{1}{2}$$

which can be written as $$\|v\| < \frac{q}{2t} - t = \frac{\Delta}{2} + \frac{r_t(q)}{2t} - t < \frac{\Delta}{2}$$

and the noise bound $\Delta/2$ is output by the function inherent_noise_max.

As an overview of the noise growth (e.g., ciphertext noise increase), the inherent noise means the norm $\|v\|$, not the polynomial v, as explained above. The noise growth estimates are shown in Table 2 below for each homomorphic operation, described as the output noise in terms of the noises of the inputs and the encryption parameters (see Tablet above). For input ciphertexts $ct_i$, the respective inherent noises are denoted by $v_i$. When there is a single encrypted input ct, its inherent noise is denoted by v. The following discussion points out aspects about noise growth to consider.

Every ciphertext, even if newly encrypted, contains a non-zero amount of noise. In the FV scheme, the noise in a newly encrypted ciphertext depends only on the degree n of the polynomial modulus and a bound B of the output of the error distribution $\chi$. Addition and subtraction operations have an almost insignificantly small impact on the noise or noise growth. In practice, $r_t(q)<t<<\Delta/2$. Plain multiplication increases the noise by a constant factor that depends on the plaintext multiplier m. If integer encoders are used, N (the number of nonzero coefficients of m) and particularly $\|m\|$ can be small, in which case the increase in noise can be just a few bits. When PolyCRTBuilder is used, the situation is different as $N \approx n$ and $\|m\| \approx t$, and plain multiplication results in roughly the same kind of noise growth as normal multiplication.

Generally, multiplication increases the noise by a multiplicative factor of t when integer encoders are used, and by a factor of nt when PolyCRTBuilder is used. However, there is an additional multiplicative factor that depends in an exponential way on the sizes of the ciphertexts. When relinearization is used, the sizes never grow too large and this factor becomes largely insignificant. However, if relinearization is not used, it can easily become the dominant factor in the noise of the result. In addition to performance increases from having smaller ciphertext sizes, this is another good reason to perform relinearization, which increases the noise only by an additive factor that mainly depends on the encryption parameters. This should be contrasted with how multiplication increases the noise by a multiplicative factor. This means, for example, that after a few multiplications have been performed and the noise has reached a size larger than the additive factor, relinearization no longer affects the noise in a harmful way at all. Instead, it will only be beneficial due to the smaller noise increase in subsequent multiplications (see above).

On the other hand, relinearizing after the very first multiplication is typically not an optimal strategy due to the additive factor being significantly larger than the noise resulting purely from multiplications. Subsequent multiplications will then build more noise on top of the (relatively large) additive factor that came from relinearization. The decomposition bit count has a significant effect on the performance of relinearization, but also on the noise growth in relinearization. Tuning down the decomposition bit count, and thus decreasing w, can have a negative impact the performance, but also a positive impact on noise growth in relinearization.

Table 2 below indicates noise estimates for homomorphic operations.

TABLE 2

Noise estimates for homomorphic operations

| Operation | Input Description | Output Noise |
| --- | --- | --- |
| Encrypt | Plaintext $m \in R_t$ | $2B\sqrt{2n/3}$ |
| Negate | Ciphertext ct | v |
| Add/Sub | Ciphertexts $ct_1$ and $ct_2$ | $v_1 + v_2 + r_t(q)$ |
| AddPlain/SubPlain | Ciphertext ct and plaintext m | $v + r_t(q)$ |
| MultiplyPlain | Ciphertext ct and plaintext m with N non-zero coefficients | $N\|m\|(\|v\| + rt(q)/2)$ |
| Multiply (w/ integer encoders) | Ciphertexts $ct_1$ and $ct_2$ of sizes $j_1 + 1$ and $j_2 + 1$ | $t(\|v_1\| + \|v_2\| + rt(q)) \times [\sqrt{2n/3}]^{k-1} 2^{j_1+j_2}$ |
| Multiply (w/ PolyCRTBuilder) | Ciphertexts $ct_1$ and $ct_2$ of sizes $j_1 + 1$ and $j_2 + 1$ | $nt(\|v_1\| + \|v_2\| + rt(q)) \times [\sqrt{2n/3}]^{k-1} 2^{j_1+j_2}$ |
| Relinearize | Ciphertext ct of size K and target size L such that $2 \le L < K$ | $v + (K - L)\sqrt{n}B(l + 1)w$ |
| AddMany | Ciphertexts $ct_1, \ldots, ct_k$ | $\Sigma_i v_i + (k - 1)r_t(q)$ |
| MultiplyMany | Ciphertexts $ct_1, \ldots, ct_k$ | Apply Multiply in a tree-like manner |
| Exponentiate | Ciphertext ct and exponent k | Apply MultiplyMany to k copies of ct |

Example methods 300 and 400 are described with reference to respective FIGS. 3 and 4 in accordance with one or more aspects of variable relinearization in homomorphic encryption. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
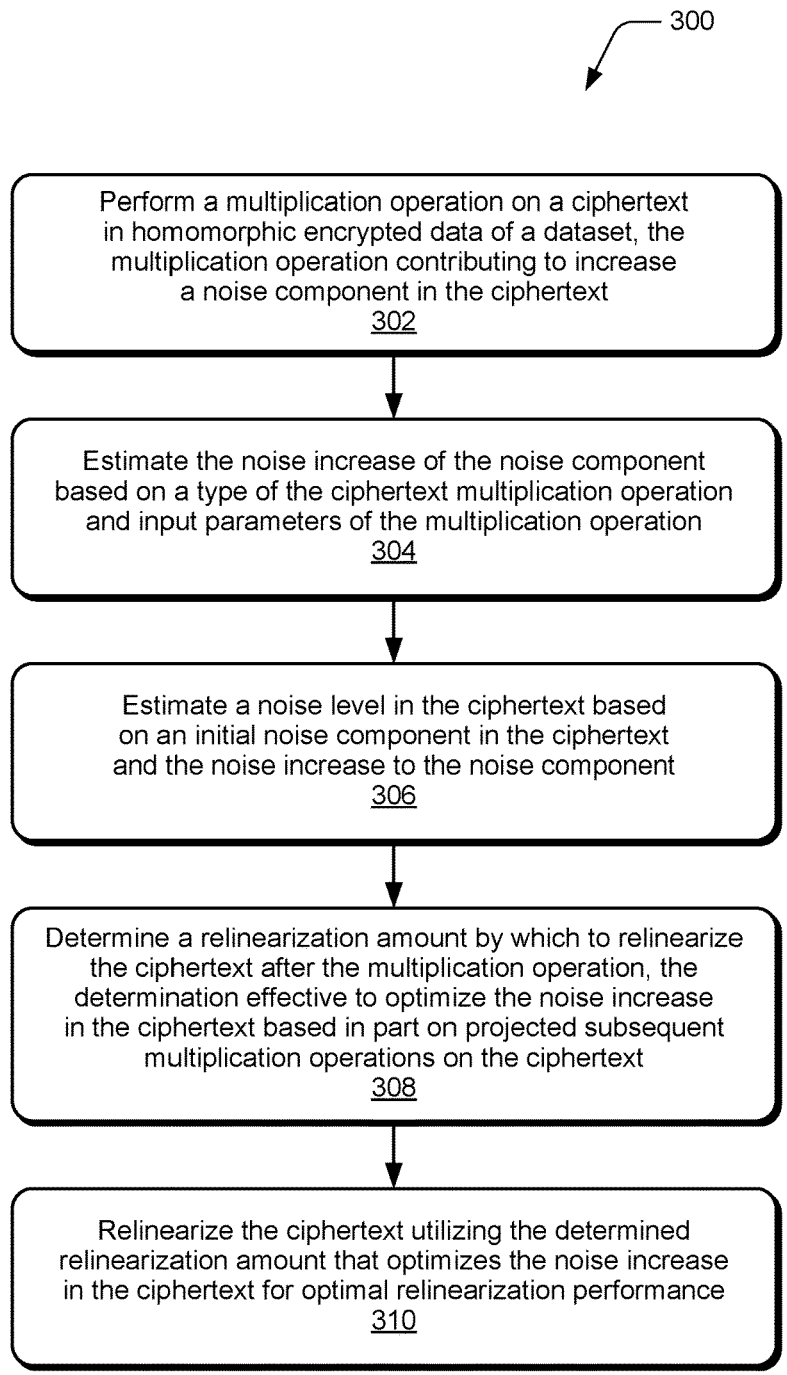
FIG. 3 illustrates an example method of variable relinearization in homomorphic encryption in accordance with techniques described herein.

FIG. 3 illustrates an example method 300 of variable relinearization in homomorphic encryption, and is generally described with reference to the encryption application implemented by a computing device and/or server device. The order in which the method is described is not intended to be construed as a limitation, and any number or combination of the method operations can be performed in any order to implement a method, or an alternate method.

At 302, a multiplication operation is performed on a ciphertext in homomorphic encrypted data of a dataset, the multiplication operation contributing to increase a noise component in the ciphertext. For example, the encryption application 114 that is implemented by the computing device 100 performs a multiplication operation 112 on the ciphertext 116 in the homomorphic encrypted data 106, and the multiplication operation 112 contributing to increase the noise component 118 in the ciphertext 116. Similarly, the encryption application 114 that is implemented by the cloud-based service 202 performs the multiplication operations 112 on the ciphertexts 108 in the homomorphic encrypted data 106, and the multiplication operations 112 contribute to increase the noise components 118 in the respective ciphertexts.

At 304, the noise increase of the noise component is estimated based on a type of the ciphertext multiplication operation and input parameters of the multiplication operation. For example, the encryption application 114 that is implemented by the computing device 100 estimates the noise increase of the noise component 118 that is contributed by the multiplication operation 112 based on a type of the ciphertext multiplication operation and input parameters of the multiplication operation. Similarly, the encryption application 114 that is implemented by the cloud-based service 202 estimates the noise increase of the noise component 118 that is contributed by the multiplication operation 112 based on a type of the ciphertext multiplication operation and input parameters of the multiplication operation.

At 306, a noise level in the ciphertext is estimated based on an initial noise component in the ciphertext and the noise increase to the noise component. For example, the variable relinearization algorithm 120 of the encryption application 114 that is implemented by the computing device 100 estimates the noise level in the ciphertext 116 as the ciphertext noise level estimate 124 based on the initial noise component 126 in the ciphertext 116 and based on the noise increase to the noise component 118. Similarly, the encryption application 114 that is implemented by the cloud-based service 202 estimates the noise level in the ciphertext 116 as the ciphertext noise level estimate 124 based on the initial noise component 126 in the ciphertext 116 and based on the noise increase to the noise component 118 generated by the multiplication operation 112.

At 308, a relinearization amount by which to relinearize the ciphertext is determined after the multiplication operation, the determination effective to optimize the noise increase in the ciphertext based in part on projected subsequent multiplication operations on the ciphertext. For example, the variable relinearization algorithm 120 of the encryption application 114 that is implemented by the computing device 100 determines the variable relinearization amount 122 by which to relinearize the ciphertext 116 after the multiplication operation 112. The variable relinearization amount 122 is determined to optimize the noise increase in the ciphertext 116 that is attributable to relinearizing the ciphertext, and may be determined as a relinearization amount not greater than a current noise level in the ciphertext. The current noise level in the ciphertext 116 is based on the initial noise component 126 in the ciphertext and the noise increase to the noise component 118 that is contributed by the multiplication operation 112.

In implementations, the variable relinearization algorithm 120 of the encryption application 114 determines the variable relinearization amount 122 as a size of the homomorphic encryption evaluation keys 128 of the encryption scheme used to generate the homomorphic encrypted data 106, and the determined size of the evaluation keys 128 is effective to optimize the noise increase in the ciphertext 116 resulting from the relinearization. Similarly, the encryption application 114 that is implemented by the cloud-based service 202 determines the variable relinearization amount 122 by which to relinearize the ciphertext 116 after the multiplication operation 112 to optimize the noise increase in the ciphertext 116 that is attributable to relinearizing the ciphertext.

At 310, the ciphertext is relinearized utilizing the determined relinearization amount that optimizes the noise increase in the ciphertext for optimal relinearization performance. For example, the encryption application 114 that is implemented by the computing device 100 relinearizes the ciphertext 116 utilizing the determined variable relinearization amount 122 that optimizes the noise increase (e.g., optimizes the noise increase to the noise component 118) in the ciphertext for optimal relinearization performance. Similarly, the encryption application 114 that is implemented by the cloud-based service 202 relinearizes the ciphertext 116 utilizing the determined variable relinearization amount 122 that optimizes the noise increase (e.g., optimizes the noise increase to the additive noise component 118) in the ciphertext.

Figure 4:
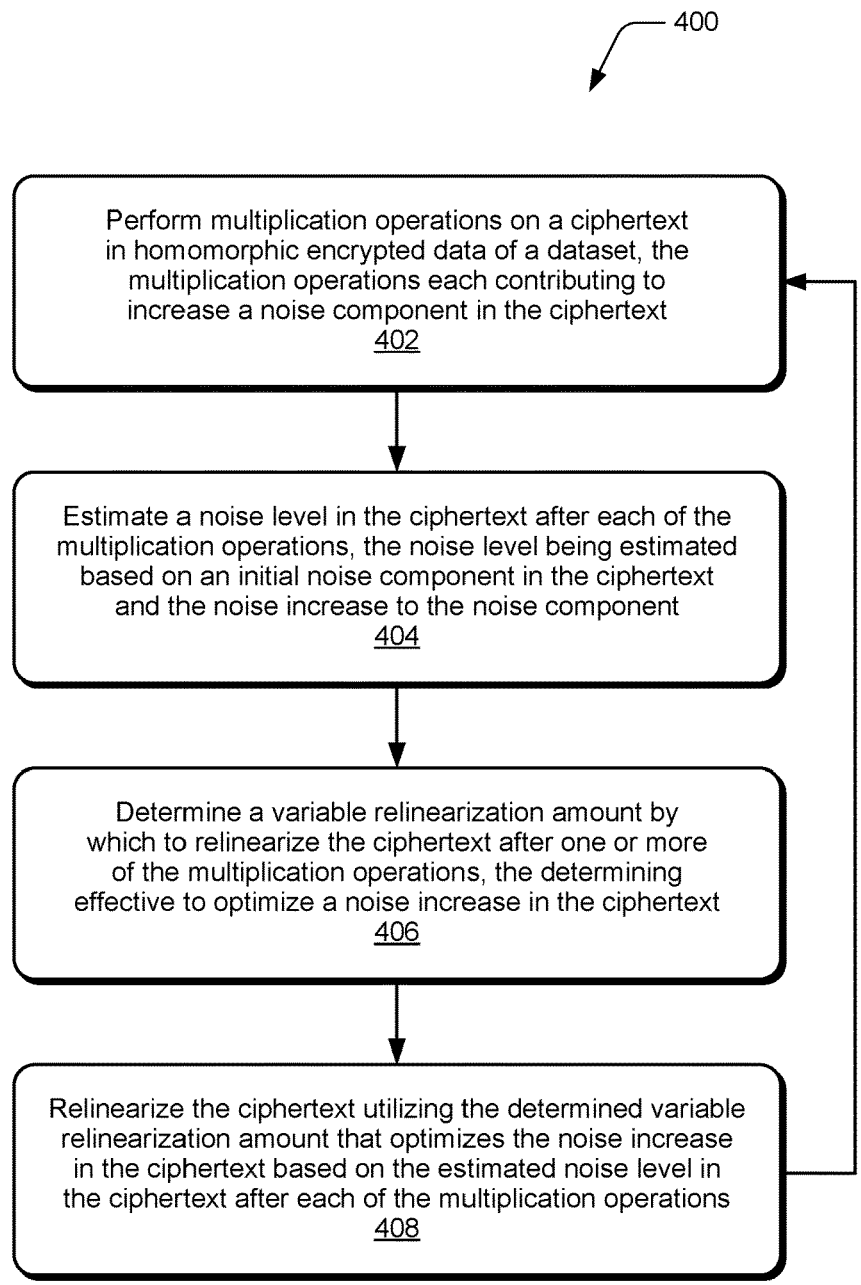
FIG. 4 illustrates an example method of variable relinearization in homomorphic encryption in accordance with techniques described herein.

FIG. 4 illustrates an example method 400 of variable relinearization in homomorphic encryption, and is generally described with reference to the encryption application implemented by a computing device and/or server device. The order in which the method is described is not intended to be construed as a limitation, and any number or combination of the method operations can be performed in any order to implement a method, or an alternate method.

At 402, multiplication operations are performed on a ciphertext in homomorphic encrypted data of a dataset, the multiplication operations each contributing to increase a noise component in the ciphertext. For example, the encryption application 114 that is implemented by the computing device 100 and/or by the cloud-based service 202 performs the multiplication operations 112 on the ciphertext 116 in the homomorphic encrypted data 106, and the multiplication operations 112 each contribute to increase the noise component 118 in the ciphertext 116.

At 404, a noise level in the ciphertext is estimated after each of the multiplication operations, the noise level being estimated based on an initial noise component in the ciphertext and the noise increase to the noise component. For example, the variable relinearization algorithm 120 of the encryption application 114 that is implemented by the computing device 100 and/or by the cloud-based service 202 estimates the noise level in the ciphertext 116 as the ciphertext noise level estimate 124 after each of the multiplication operations 112, the ciphertext noise level estimate 124 being estimated based on the initial noise component 126 in the ciphertext 116 and based on the noise increase to the noise components 118 generated by the multiplication operations 112.

At 406, a variable relinearization amount by which to relinearize the ciphertext is determined after one or more of the multiplication operations, the determining effective to optimize a noise increase in the ciphertext based in part on subsequent ones of the multiplication operations performed on the ciphertext. For example, the variable relinearization algorithm 120 of the encryption application 114 that is implemented by the computing device 100 and/or by the cloud-based service 202 determines the variable relinearization amount 122 by which to relinearize the ciphertext 116 after one or more of the multiplication operations 112. This variable relinearization amount 122 optimizes the noise increase that is attributable to relinearizing the ciphertext 116 after one or more of the multiplication operations 112, and the variable relinearization amount 122 can be determined as not being greater than a current noise level in the ciphertext. In implementations, the variable relinearization algorithm 120 of the encryption application 114 determines the variable relinearization amount 122 as a size of the homomorphic encryption evaluation keys 128 of the encryption scheme used to generate the homomorphic encrypted data 106, and the determined size of the evaluation keys 128 is effective to optimize the noise increase in the ciphertext 116 resulting from the relinearization.

At 408, the ciphertext is relinearized utilizing the determined variable relinearization amount that optimizes the noise increase in the ciphertext based on the estimated noise level in the ciphertext after each of the multiplication operations. For example, the encryption application 114 that is implemented by the computing device 100 and/or by the cloud-based service 202 relinearizes the ciphertext 116 utilizing the determined variable relinearization amount 122 that optimizes the noise increase (e.g., minimizes the additive noise component 118) in the ciphertext. The method then continues at 402 to perform a next multiplication operation, at 404 to estimate the noise level in the ciphertext contributed by the next multiplication operation, at 406 to determine the variable relinearization amount by which to relinearization the ciphertext, and at 408 to relinearization the ciphertext utilizing the determined variable relinearization amount to optimize the noise increase in the ciphertext.

Figure 5:
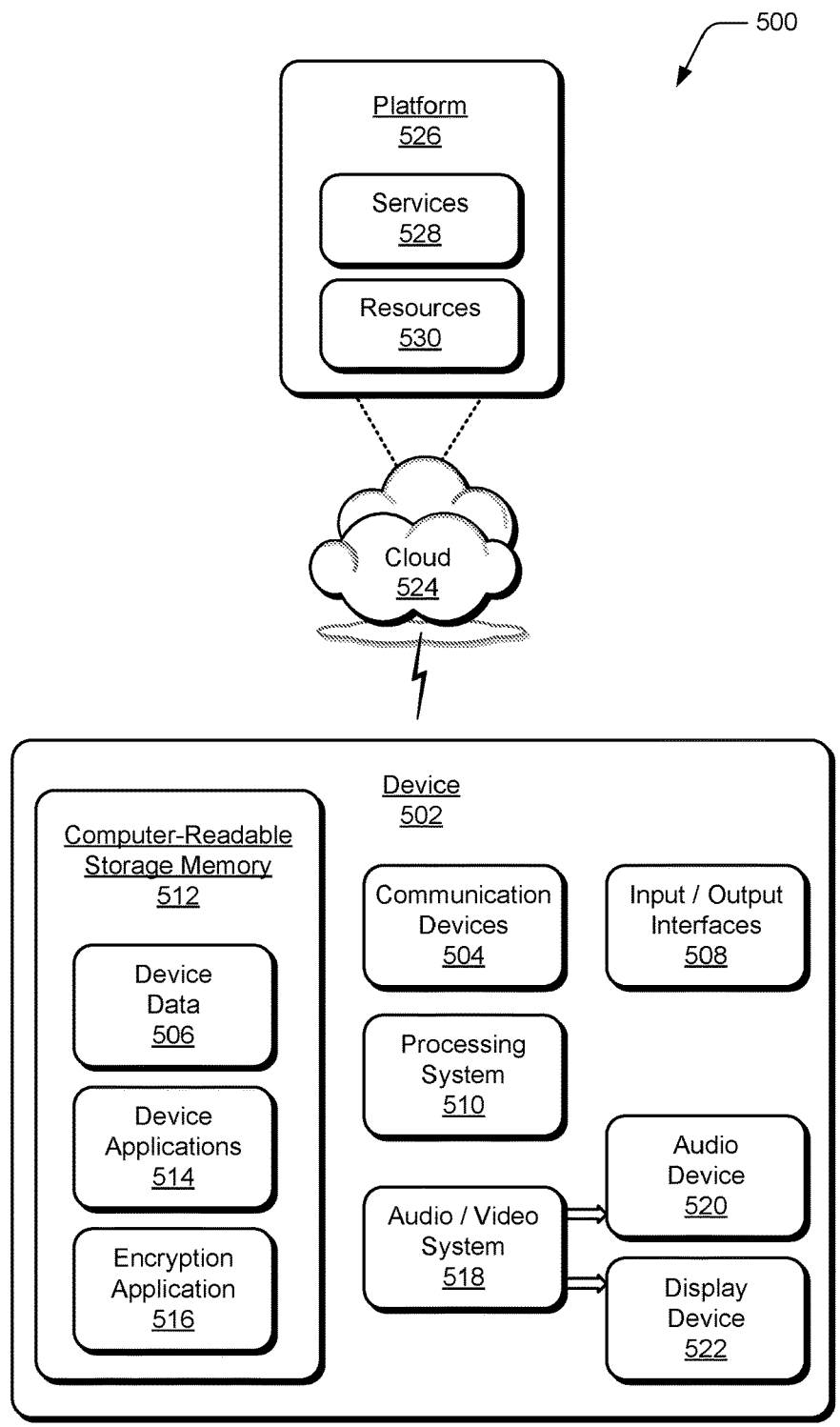
FIG. 5 illustrates an example system with an example device that can implement variable relinearization in homomorphic encryption as described herein.

FIG. 5 illustrates an example system 500 that includes an example device 502, which can implement aspects of variable relinearization in homomorphic encryption. The example device 502 can be implemented as any of the computing devices, user devices, and server devices described with reference to the previous FIGS. 1-4, such as any type of mobile device, wearable device, client device, mobile phone, tablet, computing, communication, entertainment, gaming, media playback, and/or other type of device. For example, the computing device and server device described herein may be implemented as the example device 502 or with various components of the example device.

The device 502 includes communication devices 504 that enable wired and/or wireless communication of device data 506, such as homomorphic encrypted data, dataset bits of the homomorphic encrypted data, ciphertexts, and any other type of data related to homomorphic encrypted data and queries. Additionally, the device data can include any type of audio, video, and/or image data. The communication devices 504 can also include transceivers for cellular phone communication and for network data communication.

The device 502 also includes input/output (I/O) interfaces 508, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes a computer-readable storage memory 512, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 512 provides storage of the device data 506 and various device applications 514, such as an operating system that is maintained as a software application with the computer-readable storage memory and executed by the processing system 510. In this example, the device applications include an encryption application 516 that implements the features and techniques of variable relinearization in homomorphic encryption, such as when the example device 502 is implemented as the computing device 100 and/or as a server device of the cloud-based service 202 described herein with reference to FIGS. 1-4. Examples of the encryption application 516 include the encryption application 114 implemented by the computing device 100 as described with reference to FIG. 1, and the encryption application 114 implemented by a server device of the cloud-based service 202 as described with reference to FIG. 2.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In aspects of variable relinearization in homomorphic encryption, at least part of the techniques described herein may be implemented in a distributed system, such as over a "cloud" 524 in a platform 526. The cloud 524 includes and/or is representative of the platform 526 for services 528 and/or resources 530. The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud.

Although aspects of variable relinearization in homomorphic encryption have been described in language specific to features and/or methods, the appended claims are not necessarily limited to the specific features or methods described. Rather, the specific features and methods are disclosed as example implementations of variable relinearization in homomorphic encryption, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following:

A computing device implemented for variable relinearization in homomorphic encryption, the computing device comprising: a memory configured to store homomorphic encrypted data as a dataset; a processor system configured to execute an encryption application that is implemented to: perform a multiplication operation on a ciphertext in the homomorphic encrypted data of the dataset, the multiplication operation contributing to increase a noise component in the ciphertext; determine a relinearization amount by which to relinearize the ciphertext after the multiplication operation, the determination effective to optimize a noise increase in the ciphertext based at least in part on projected subsequent multiplication operations on the ciphertext; and relinearize the ciphertext utilizing the determined relinearization amount that optimizes the noise increase in the ciphertext.

Alternatively or in addition to the above described computing device, any one or combination of: the encryption application optimizes the noise increase for optimal relinearization performance. The encryption application is implemented to optimize the noise increase attributable to relinearizing the ciphertext. The encryption application is implemented to: estimate a noise level in the ciphertext, the noise level estimated based on an initial noise component in the ciphertext and the noise increase to the noise component; and determine the relinearization amount based on the estimated noise level in the ciphertext. The encryption application is implemented to estimate the noise increase of the noise component based on a type of the ciphertext multiplication operation and input parameters of the multiplication operation. The encryption application is implemented to determine the relinearization amount not greater than a current noise level in the ciphertext. The current noise level in the ciphertext is based on an initial noise component in the ciphertext and the noise increase to the noise component from the multiplication operation. The encryption application is implemented to determine the relinearization amount as a size of evaluation keys of an encryption scheme used to generate the homomorphic encrypted data, the size of the evaluation keys determined effective to optimize the noise increase in the ciphertext resulting from the relinearization.

A method for variable relinearization in homomorphic encryption, the method comprising: performing a multiplication operation on a ciphertext in homomorphic encrypted data of a dataset, the multiplication operation contributing to increase a noise component in the ciphertext; determining a relinearization amount by which to relinearize the ciphertext after the multiplication operation, the determining effective to optimize a noise increase in the ciphertext based at least in part on projected subsequent multiplication operations on the ciphertext; and relinearizing the ciphertext utilizing the determined relinearization amount that optimizes the noise increase in the ciphertext for optimal relinearization performance.

Alternatively or in addition to the above described method, any one or combination of: the method further comprising optimizing the noise increase attributable to the relinearizing the ciphertext. The method further comprising estimating a noise level in the ciphertext, the noise level estimated based on an initial noise component in the ciphertext and the noise increase to the noise component; and said determining the relinearization amount based on the estimated noise level in the ciphertext. The method further comprising estimating the noise increase of the noise component based on a type of the ciphertext multiplication operation and input parameters of the multiplication operation. The determining the relinearization amount not greater than a current noise level in the ciphertext. The current noise level in the ciphertext is based on an initial noise component in the ciphertext and the noise increase to the noise component from the multiplication operation. The determining the relinearization amount as a size of evaluation keys of an encryption scheme used to generate the homomorphic encrypted data. The method further comprising determining the size of the evaluation keys effective to optimize the noise increase in the ciphertext resulting from the relinearization.

A method for variable relinearization in homomorphic encryption, the method comprising: performing multiplication operations on a ciphertext in homomorphic encrypted data of a dataset, the multiplication operations each contributing to increase a noise component in the ciphertext; estimating a noise level in the ciphertext after each of the multiplication operations, the noise level being estimated based on an initial noise component in the ciphertext and the noise increase to the noise component; determining a variable relinearization amount by which to relinearize the ciphertext after one or more of the multiplication operations, the determining effective to optimize a noise increase in the ciphertext based at least in part on subsequent ones of the multiplication operations performed on the ciphertext; and relinearizing the ciphertext utilizing the determined variable relinearization amount that optimizes the noise increase in the ciphertext based on the estimated noise level in the ciphertext after each of the multiplication operations.

Alternatively or in addition to the above described method, any one or combination of: the method further comprising optimizing the noise increase attributable to the relinearizing the ciphertext after one or more of the multiplication operations. The determining the variable relinearization amount not greater than a current noise level in the ciphertext. The determining the variable relinearization amount as a size of evaluation keys of an encryption scheme used to generate the homomorphic encrypted data.

The invention claimed is:

1. A computing device implemented for variable relinearization in homomorphic encryption, the computing device comprising:
   a memory configured to store homomorphic encrypted data as a dataset;
   a processor system configured to execute an encryption application that is implemented to:
   receive a request containing a query of the homomorphic encrypted data of the dataset from another computing device via a communications network; and
   evaluate the homomorphic encrypted data of the dataset based on the query to determine requested data by which the processor system:
     performs a multiplication operation on a ciphertext in the homomorphic encrypted data of the dataset responsive to the query, the multiplication operation contributing to increase a noise component in the ciphertext;
     determines one or more projected subsequent multiplication operations on the ciphertext;
     determines a relinearization amount that sets a noise increase in the ciphertext to a size that satisfies a noise increase performance target based at least in part on the one or more projected subsequent multiplication operations on the ciphertext, wherein the relinearization amount is determined based at least in part on a number of the one or more projected subsequent multiplication operations;
     relinearizes the ciphertext utilizing the determined relinearization amount; and
     returns the requested data to the other computing device via the communications network.

2. The computing device as recited in claim 1, wherein the encryption application is implemented to set the noise increase attributable to relinearizing the ciphertext to the size that satisfies the noise increase performance target.

3. The computing device as recited in claim 1, wherein the encryption application is implemented to:
   estimate a noise level in the ciphertext, the noise level estimated based on an initial noise component in the ciphertext and the noise increase to the noise component; and
   determine the relinearization amount based on the estimated noise level in the ciphertext.

4. The computing device as recited in claim 2, wherein the encryption application is implemented to estimate the noise increase of the noise component based on a type of the ciphertext multiplication operation and input parameters of the multiplication operation.

5. The computing device as recited in claim 1, wherein the encryption application is implemented to determine the relinearization amount not greater than a current noise level in the ciphertext.

6. The computing device as recited in claim 4, wherein the current noise level in the ciphertext is based on an initial noise component in the ciphertext and the noise increase to the noise component from the multiplication operation.

7. The computing device as recited in claim 1, wherein the encryption application is implemented to determine the relinearization amount as a size of evaluation keys of an encryption scheme used to generate the homomorphic encrypted data, the size of the evaluation keys determined effective to optimize the noise increase in the ciphertext resulting from the relinearization.

8. A method for variable relinearization in homomorphic encryption, the method comprising:
storing homomorphic encrypted data as a dataset in a memory device; and
at a processor system:
receiving a request containing a query of the homomorphic encrypted data of the dataset from another computing device via a communications network; and
evaluating the homomorphic encrypted data of the dataset based on the query to determine requested data at least in part by:
performing a multiplication operation on a ciphertext in the homomorphic encrypted data of the dataset responsive to the query, the multiplication operation contributing to increase a noise component in the ciphertext;
determining one or more projected subsequent multiplication operations on the ciphertext;
determining a relinearization amount that sets a noise increase in the ciphertext to a size that satisfies a noise increase performance target based at least in part on the one or more projected subsequent multiplication operations on the ciphertext, wherein the relinearization amount is determined based at least in part on a number of the one or more projected subsequent multiplication operations;
relinearizing the ciphertext utilizing the determined relinearization amount; and
returning the requested data to the other computing device via the communications network.

9. The method as recited in claim 8, further comprising:
setting the noise increase attributable to the relinearizing the ciphertext to the size that satisfies the noise increase performance target.

10. The method as recited in claim 8, further comprising:
estimating a noise level in the ciphertext, the noise level estimated based on an initial noise component in the ciphertext and the noise increase to the noise component; and
said determining the relinearization amount based on the estimated noise level in the ciphertext.

11. The method as recited in claim 10, further comprising:
estimating the noise increase of the noise component based on a type of the ciphertext multiplication operation and input parameters of the multiplication operation.

12. The method as recited in claim 8, wherein the relinearization amount is not greater than a current noise level in the ciphertext.

13. The method as recited in claim 12, wherein the current noise level in the ciphertext is based on an initial noise component in the ciphertext and the noise increase to the noise component from the multiplication operation.

14. The method as recited in claim 8, wherein the relinearization amount is determined to be a size of evaluation keys of an encryption scheme used to generate the homomorphic encrypted data.

15. The method as recited in claim 14, further comprising:
determining the size of the evaluation keys effective to set the noise increase in the ciphertext resulting from the relinearization to the size that satisfies the noise increase performance target.

16. A method for variable relinearization in homomorphic encryption, the method comprising:
storing homomorphic encrypted data as a dataset in a memory device; and
at a processor system:
receiving a request containing a query of the homomorphic encrypted data of the dataset from another computing device via a communications network; and
evaluating the homomorphic encrypted data of the dataset based on the query to determine requested data at least in part by:
performing multiplication operations on a ciphertext in the homomorphic encrypted data of the dataset responsive to the query, the multiplication operations each contributing to increase a noise component in the ciphertext;
estimating a noise level in the ciphertext after each of the multiplication operations, the noise level being estimated based on an initial noise component in the ciphertext and the noise increase to the noise component;
determining a variable relinearization amount that sets a noise increase in the ciphertext to a size that satisfies a noise increase performance target based at least in part on one or more subsequent multiplication operations performed on the ciphertext, wherein the relinearization amount is determined based at least in part on a number of the one or more projected subsequent multiplication operations;
relinearizing the ciphertext utilizing the determined variable relinearization amount; and
returning the requested data to the other computing device via the communications network.

17. The method as recited in claim 16, further comprising:
setting the noise increase attributable to the relinearizing the ciphertext after one or more of the multiplication operations to the size that satisfies the noise increase performance target.

18. The method as recited in claim 16, wherein the variable relinearization amount is not greater than a current noise level in the ciphertext.

19. The method as recited in claim 16, wherein the variable relinearization amount is determined to be a size of evaluation keys of an encryption scheme used to generate the homomorphic encrypted data.

* * * * *